(12) United States Patent
Fujisawa et al.

(10) Patent No.: US 6,740,449 B2
(45) Date of Patent: May 25, 2004

(54) NICKEL ELECTRODE FOR ALKALINE STORAGE BATTERY AND METHOD OF MANUFACTURING THE SAME

(75) Inventors: Chihiro Fujisawa, Hyogo (JP); Takuya Tamagawa, Hyogo (JP); Yoichiro Shibata, Sumoto (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 182 days.

(21) Appl. No.: 09/813,998

(22) Filed: Mar. 22, 2001

(65) Prior Publication Data
US 2001/0033970 A1 Oct. 25, 2001

(30) Foreign Application Priority Data
Mar. 27, 2000 (JP) .......... 2000-087628

(51) Int. Cl.$^7$ .................. H01M 4/52
(52) U.S. Cl. .......... 429/223; 429/209; 429/218.1; 429/231.1
(58) Field of Search .......... 429/209, 218.1, 429/223, 223.1, 231.1

(56) References Cited

U.S. PATENT DOCUMENTS 6,033,805 A * 3/2000 Dansui et al. .......... 429/223
6,129,902 A * 10/2000 Sakamoto et al. .......... 423/594

* cited by examiner

Primary Examiner—Carol Chaney
Assistant Examiner—Dah-Wei Yuan
(74) Attorney, Agent, or Firm—Westerman, Hattori, Daniels & Adrian, LLP

(57) ABSTRACT

A nickel electrode for an alkaline storage battery is made by filling a conductive porous member with an active material including a main active material layer substantially made of nickel hydroxide and containing cobalt in a state of a solid solution, and a compound layer containing at least one element selected from the group consisting of calcium, aluminum, strontium, scandium, yttrium, and lanthanoide series, the compound layer being formed on a surface of the main active material layer. A metal molar ratio of cobalt contained in the main active material layer to nickel contained in the main active material layer is in a range of 0.5% to 3.0%, and a metal molar ratio of the at least one element contained in the compound layer to nickel contained in the active material is in a range of 0.3% to 5.0%.

4 Claims, 5 Drawing Sheets

NICKEL ELECTRODE FOR ALKALINE STORAGE BATTERY AND METHOD OF MANUFACTURING THE SAME

BACKGROUND OF THE INVENTION (1) Field of the Invention

The present invention relates to a nickel electrode for an alkaline storage battery and a method of manufacturing the nickel electrode. In particular, the present invention relates to improvements in active material for use in the nickel electrode.

(2) Prior Art

Alkaline storage batteries using conventional nickel electrodes have the following problem. As the charging reaction and the gaseous oxygen generating reaction that occur in such an alkaline storage battery requires similar electric potentials, the oxygen over potential (which means the potential difference between the charging reaction and the gaseous oxygen generating reaction in this specification) decreases at high temperatures. This lowers the charging efficiency of the alkaline storage battery.

In view of such a problem, the following techniques to increase the oxygen over potential have been devised.

One of them is a technique to mix cobalt with nickel hydroxide to form a solid solution and use the solid solution as active material. However, if a large amount of cobalt is used, the operating voltage of the alkaline storage battery decreases. Furthermore, the manufacturing cost of such an alkaline storage battery is high, as cobalt is expensive.

Japanese Laid-Open Patent Application No. H11-73957 discloses a technique for uniformly mixing nickel, cobalt, and yttrium in a nickel electrode for an alkali storage battery. However, the charging efficiency of this alkaline storage battery at high temperatures does not improve significantly.

Also, Japanese Laid-Open Patent Application No. H10-125318 discloses a technique for covering a surface of the active material mainly composed of nickel hydroxide with a layer of an independent crystal. The independent crystal is a solid solution mainly composed of nickel hydroxide active material particles, and contains elements selected from the group consisting of Mg, Ca, Al, Sr, and the like, and elements selected from the group consisting of Co and Mn. However, generally, the active material for a nickel electrode should include as few elements other than nickel as possible, in view of not lowering the energy density of the alkaline storage battery. Moreover, only the elements selected from the group consisting of Mg, Ca, Al, Sr, and the like can have the effect of preventing the charging efficiency of the alkaline storage battery from being lowered at high temperatures, therefore, the elements selected from the group consisting of Co and Mn do not need to be used. Furthermore, the presence of cobalt on the surface of the active material lowers the operating voltage of the alkaline storage battery. Therefore, it is not preferable to use cobalt in the layer covering the active material.

Also, Japanese Laid-Open Patent Application No. H10-149821 discloses a technique for forming active material having a dual-layer structure, in such a manner that the upper layer in the active material has a different composition from the lower layer of the active material. The upper layer contains high density of Ca, Ti, and the like, whereas the lower layer contains high density of Al, V, and the like. However, as the main component of the upper layer is nickel, the elements such as Ca and Ti have little effect of improving the charging efficiency of an alkaline storage battery at high temperatures.

SUMMARY OF THE INVENTION

In view of the above problems, the present invention aims to provide a nickel electrode for use in an alkaline storage battery that exhibits excellent charging characteristics at high temperatures with relatively low manufacturing cost. The present invention also aims to provide a method of manufacturing the nickel electrode.

As explained above, the technique for including cobalt and elements selected from the group consisting of Ca, Al, Sr, Sc, Y, and Ln (lanthanoide series) in the nickel electrode is well-known. However, the inventors of the present application have made thorough studies to obtain a nickel electrode that would provide an alkaline storage battery with high operating voltage and prevent the charging efficiency from being lowered at high temperatures when employed in the alkaline storage battery. As a result, the inventors have come up with the necessity of designating the locations and the compounding ratios of the above listed elements in the nickel electrode in the following way.

As for cobalt, instead of including it on the surface of the active material mainly composed of nickel, by mixing it into the active material in a state of a solid solution, the energy density of an alkaline storage battery is prevented from decreasing, and also the charging efficiency of the alkali storage battery is improved. On the other hand, problems remain as that the operating voltage of the alkaline storage battery is lowered in such a case, and that the manufacturing cost may increase if a large amount of cobalt is used. It is difficult to find an appropriate balance between the improved charging characteristics at high temperatures, the operating voltage, and the manufacturing cost.

As for the elements selected from the group consisting of Ca, Al, Sr, Sc, Y, and Ln, they are not necessarily mixed with nickel to form a solid solution for being used as active material, but may be made present at the interface between the electrolyte and the active material. In such a case, a smaller total amount of such elements can have the effect of increasing the oxygen overpotential. In short, the above listed elements should be retained on the surface of the active material.

Although the oxygen overpotential further increases if a larger total amount of the above listed elements is retained on the surface of the active material, these elements are not directly related to the charging and discharging reaction in the alkaline storage battery. They may rather have a negative effect of being a resistance force against the charging and discharging reaction. Also, in view of the energy density of the alkaline storage battery, it is not preferable to retain the large amount of such elements on the surface of the active material.

Accordingly, the amount of such elements to be retained on the surface of the active material, on the condition that the oxygen over potential increases while the energy density does not decrease, is as follows. The ratio of the elements selected from the group consisting of Ca, Al, Sr, Sc, Y, and Ln to be retained on the surface of the active material, expressed in molar percent of metal, should be in the range of 0.3% to 5% relative to the total amount of nickel contained in the active material.

Here, two methods can be considered for retaining the elements selected from the group consisting of Ca, Al, Sr, Sc, Y, and Ln, on the surface of the active material. First method is to retain only a compound of the elements on the surface of the active material (the active material being mainly composed of nickel hydroxide), without mixing the compound with other compounds. Second method is to form an eutectoid layer of a solid solution made by mixing (a) the compound of the above elements and (b) other compounds, on the surface of the active material (the active material being mainly composed of nickel hydroxide).

In the case of the second method, the elements selected from the group consisting of Ca, Al, Sr, Sc, Y, and Ln are less likely to come in contact with the electrolyte than in the case of the first method. In order for a larger amount of such elements to be present at the interface between the active material and the electrolyte, besides the ratio of the elements expressed in molar percent of metal being in the range of 0.3% to 5% relative to the total amount of nickel contained in the active material, it is preferable that the ratio of the elements to be retained on the surface of the active material, expressed in molar percent of metal, is at least 20% relative to the total amount of metals present therein.

As described above, the decreases in the charging efficiency of the alkaline storage battery at high temperatures can be prevented even when a small amount of cobalt is contained in the active material, by covering a surface of the active material with a layer made of the elements selected from the group consisting of Ca, Al, Sr, Sc, Y, and Ln. Therefore, by setting the ratio of cobalt to be contained in the part of the active material that is mainly composed of nickel compound and plays a main role in the charging and discharging reaction of the alkaline storage battery, expressed in molar percent of metal, in the range of 0.5% to 3% relative to the total amount of nickel contained in the active material, a nickel electrode that would provide an alkaline storage battery with high operating voltage and prevent the charging efficiency from being lowered when employed in the alkaline storage battery can be obtained at low manufacturing cost.

To achieve the stated object, the present invention aims to provide a nickel electrode for an alkaline storage battery including a conductive porous member; and an active material with which the conductive porous member is filled, the active material including (a) a main active material layer substantially made of nickel hydroxide, the main active material layer containing cobalt in a state of a solid solution, and (b) a compound layer that contains at least one element selected from the group consisting of calcium, aluminum, strontium, scandium, yttrium, and lanthanoide series, the compound layer being formed on a surface of the main active material layer, wherein a metal molar ratio of cobalt contained in the main active material layer to nickel contained in the main active material layer is in a range of 0.5% to 3.0% inclusive, and a metal molar ratio of the at least one element contained in the compound layer to nickel contained in the active material is in a range of 0.3% to 5.0% inclusive.

The present invention also provides a method of manufacturing a nickel electrode for an alkaline storage battery, including: a step for filling a conductive porous substrate with a main active material substantially made of nickel hydroxide, the main active material containing cobalt at a metal molar ratio of 0.5% to 3.0% in a state of a solid solution; and a step for forming a compound layer containing at least one element selected from the group consisting of calcium, aluminum, strontium, scandium, yttrium, and lanthanoide series, on a surface of the main active material.

The present invention also provides a method of manufacturing a nickel electrode for an alkaline storage battery, including: a step for forming an active material by forming a compound layer on a surface of a main active material, the main active material being substantially made of nickel hydroxide and containing cobalt at a metal molar ratio of 0.5% to 3.0% in a state of a solid solution, the compound layer containing at least one element selected from the group consisting of calcium, aluminum, strontium, scandium, yttrium, and lanthanoide series; and a step for filling a conductive porous substrate with the active material.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

The following is an explanation of a nickel electrode for use in an alkaline storage battery, according to an embodiment of the present invention, with reference to the drawings.

Overall Construction

Figure 1:
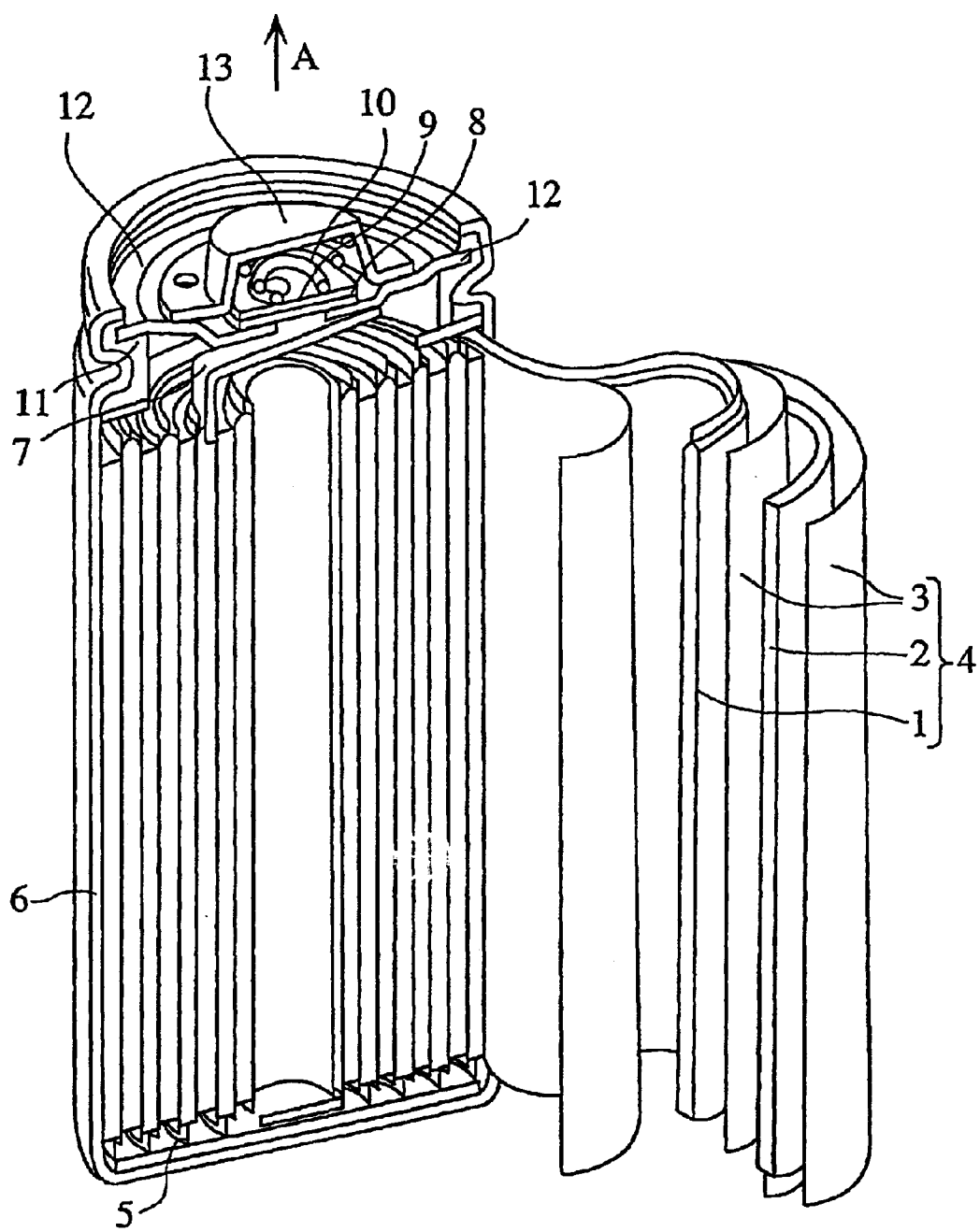
FIG. 1 is a perspective view of an alkaline storage battery, partly broken away to show the interior construction, the alkaline storage battery using a nickel electrode according to an embodiment of the present invention as its positive electrode.

FIG. 1 is a perspective view of an alkaline storage battery, partly broken away to show its interior construction, the alkaline storage battery using a nickel electrode according to the embodiment of the present invention as its positive electrode.

The battery in the figure is a cylindrical nickel-cadmium battery where a generator element 4 composed of a positive electrode 1 and a negative electrode 2 that are spirally wound with a separator 3 sandwiched in between, is enclosed in a cylindrical external casing 6, with electrolyte being injected therein. Note that the following explanation is given on a cylindrical battery as one example, however, it can also be applied to a rectangular battery.

The positive electrode 1 is formed by impregnating a conductive porous member with active material for use in a positive electrode. The active material may be mainly composed of nickel hydroxide.

The negative electrode 2 is formed by binding cadmium hydroxide to both surfaces of a punching metal, particularly into its holes, with the use of a binding agent, and then rolling and shaping the punching metal.

The following is an explanation of the construction of the battery shown in FIG. 1. A sealing plate 12 having an opening in its central part is fit into a round shaped opening at the upper end of the external casing 6, via a gasket 11. A positive electrode terminal 13 is attached to the sealing plate 12. A valve plate 8 and a keep plate 9 are placed on the sealing plate 12 in said order, the keep plate 9 being pressed by a coil spring 10. The valve plate 8, the keep plate 9, and the coil spring 10 are pressed in the direction of an arrow A as the internal pressure of the battery becomes higher, creating a gap between the valve plate 8 and the sealing plate 12. Through the gap, internal gas is discharged to the atmosphere.

The negative electrode 2 is electrically connected to a closed bottom of the external casing 6 via a negative electrode collector 5. The external casing 6 also serves as a negative terminal. The positive electrode terminal 13 is electrically connected to the positive electrode 1 via a positive electrode collector 7 and the sealing plate 12.

Detailed Construction of Positive Electrode 1

The positive electrode 1 includes a nickel substrate that serves as a conductive path, a nickel hydroxide layer formed on the surface of the nickel substrate, mainly formed on the surface of its holes, and an yttrium retaining layer covering the surface of the nickel hydroxide layer.

The nickel hydroxide layer and the yttrium retaining layer form the active material, and the nickel hydroxide layer is a main player in the charging and discharging reaction.

The nickel substrate has a predetermined porosity (for example, 80%), and forms the main conductive path in the positive electrode.

The nickel hydroxide layer is mainly composed of nickel hydroxide, with which a predetermined amount of cobalt is mixed to form a solid solution.

As explained above, the amount of cobalt to be contained in the nickel hydroxide layer is determined by considering the improved charging efficiency at high temperatures, the operating voltage, and the manufacturing cost. Based on these considerations, it is desirable to set the ratio of cobalt to be contained in the nickel hydroxide layer, expressed in molar percent of metal, in the range of 0.5% to 3% relative to the amount of nickel contained in the nickel hydroxide layer that plays a main role in the charging and discharging reaction, the nickel hydroxide layer being supported by the nickel substrate in the active material.

The yttrium retaining layer is literally made of a layer of yttrium. As explained above, the amount of yttrium to be contained in the layer is determined in view of improving the charging efficiency and the energy density. More specifically, it is desirable to set the ratio of yttrium to be contained in the layer, expressed in molar percent of metal, in the range of 0.3% to 5% relative to the total amount of nickel contained in the active material.

Also, the yttrium retaining layer may be made of only an yttrium compound, or may also be made of a solid solution composed of an yttrium compound and other metal compounds. As one example, for mixing yttrium with nickel hydroxide to make a solid solution, it is desirable that the ratio of yttrium, expressed in molar percent of metal, is at least 20% relative to the total amount of metals contained in the yttrium retaining layer in the nickel hydroxide layer.

As explained above, the nickel hydroxide layer contains cobalt, but it may also contain other metals such as cadmium.

Manufacturing Positive Electrode 1

There are two methods for manufacturing the positive electrode 1, which differ in the retaining condition of yttrium on the surface of the nickel hydroxide layer. Each method is explained as follows.

(1) In the first method, only an yttrium compound is retained on the surface of the nickel hydroxide layer in a state of yttrium hydroxide.

Figure 2:
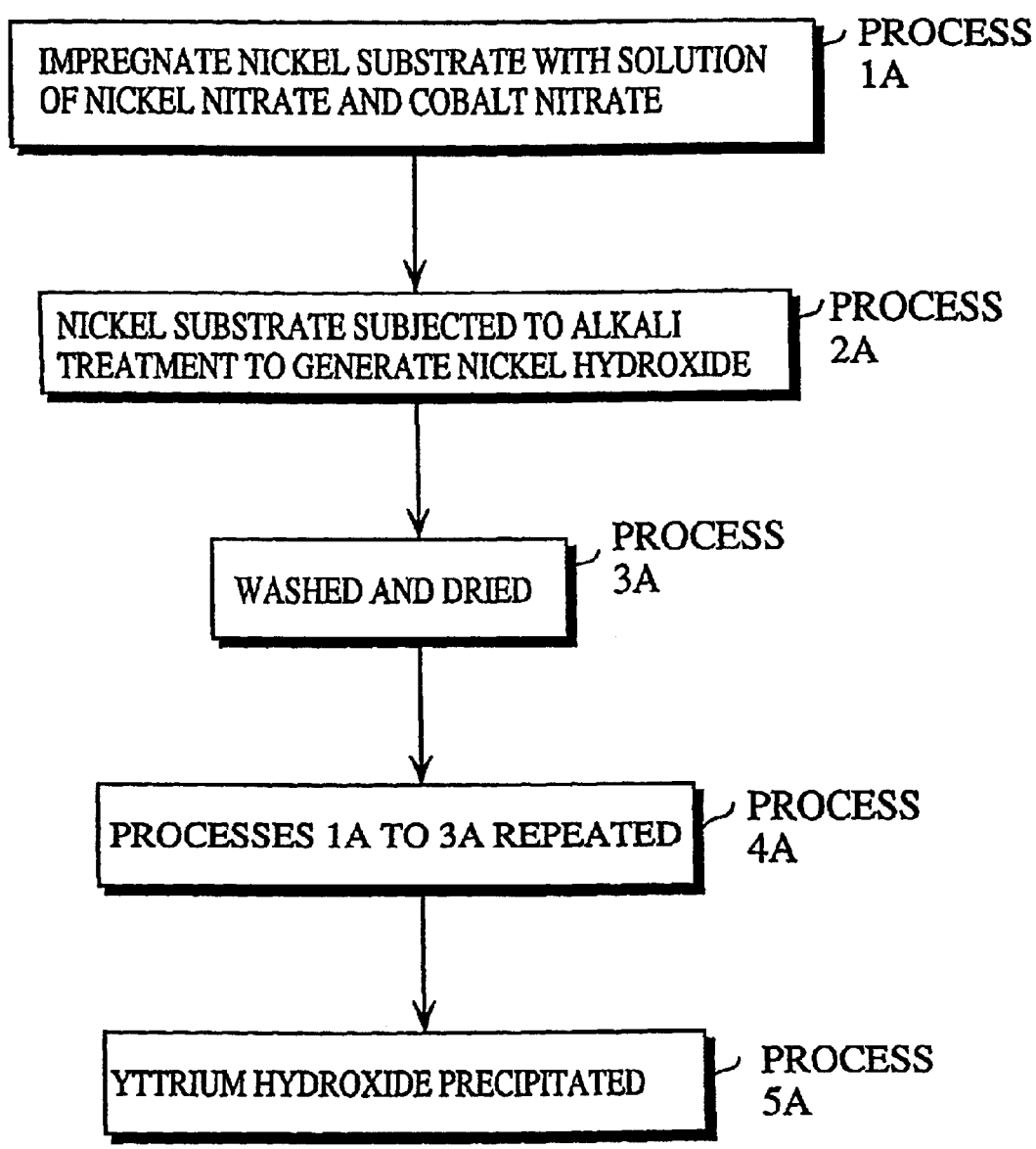
FIG. 2 shows a first method of manufacturing a positive electrode 1.

FIG. 2 shows the first method for manufacturing the positive electrode 1.

As shown in the figure, in process 1A, the nickel substrate with a predetermined porosity (for example, 80%) is impregnated with an aqueous solution in which nickel nitrate is mixed with cobalt nitrate at a predetermined molar ratio (0.5 to 3 of cobalt nitrate to 100 of nickel nitrate).

In process 2A, the nickel substrate is subjected to the alkali treatment, with being immersed in a sodium hydroxide solution, causing chemical reaction of nitrate impregnated in the nickel substrate to become nitrate hydroxide.

In process 3A, the nickel substrate is washed and dried.

In process 4A, the nickel substrate is made through processes 1A to 3A several times (for example, four times), so that the nickel hydroxide layer containing 0.5% to 3% of cobalt, in molar percent of metal, relative to the amount of nickel is obtained. The nickel substrate obtained having gone through the above processes is hereafter referred to as an electrode A.

In process 5A, the electrode A is impregnated with an yttrium nitrate solution mainly composed of yttrium nitrate with a predetermined concentration. The electrode A is then subjected to the alkali treatment, so that yttrium hydroxide is precipitated on the surface of the nickel hydroxide layer to form the yttrium hydroxide layer. Here, the condition for the impregnation, such as the concentration of the yttrium nitrate solution, is adjusted in such a manner that 0.3% to 5% of yttrium, in molar percent of metal, relative to the total amount of nickel contained in the nickel hydroxide layer is precipitated on the surface of the nickel hydroxide layer.

In this way, going through processes 1A to 5A completes the positive electrode 1.

(2) In the second method, yttrium is retained on the surface of the nickel hydroxide layer in a state of a solid solution.

Figure 3:
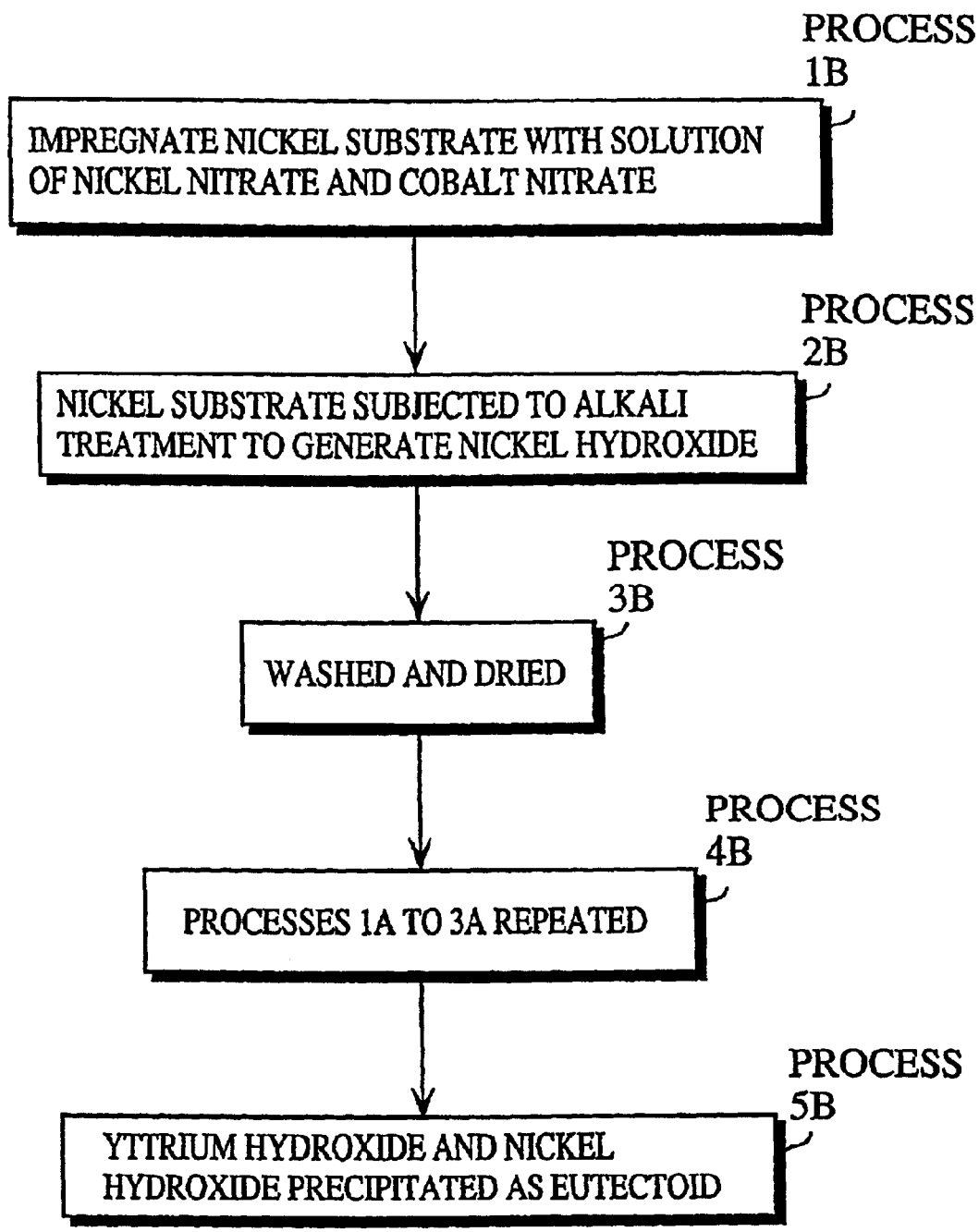
FIG. 3 shows a second method of manufacturing the positive electrode 1.

FIG. 3 shows the second method for manufacturing the positive electrode 1.

As shown in the figure, processes 1B through 4B are the same as processes 1A through 4A, and the electrode A is manufactured in the same manner as with the first manufacturing method.

In process 5B, the electrode A is impregnated with an aqueous solution in which nickel nitrate and yttrium nitrate are mixed at a predetermined molar ratio (the ratio of yttrium nitrate, expressed in molar percent of metal, is to be at least 20% in the aqueous solution). The electrode A is then subjected to the alkali treatment, precipitating yttrium hydroxide and nickel hydroxide as an eutectoid on the surface of the nickel hydroxide layer, thereby forming the yttrium retaining layer made of a solid solution of yttrium and nickel. In this way, 0.3% to 5% of yttrium, in molar percent of metal, to the total amount of nickel contained in the active material is retained on the surface of the nickel hydroxide layer, the ratio of yttrium, expressed in molar percent of metal, being at least 20% relative to the total amount of metals present in the yttrium retaining layer.

In this way, going through processes 1B to 5B completes the positive electrode 1.

Experiment

The following explains experiments conducted on nickel-cadmium batteries employing nickel electrodes that vary in the amount of cobalt, the retaining condition of yttrium, and the amount of yttrium.

Experiment 1
Nickel-cadmium Battery Used in Experiment 1

A nickel substrate with the porosity of 80% was impregnated with an aqueous solution A composed of nickel nitrate, cobalt nitrate, and cadmium nitrate at the molar ratio of Ni:Co:Cd=100:1:2. The nickel substrate was then made through the alkali treatment process a plurality of times, so that a nickel hydroxide layer mainly composed of nickel hydroxide was formed on the nickel substrate.

Following this, the nickel substrate was impregnated with a 0.5M of yttrium nitrate solution, whose pH has been adjusted to 5, for 30 minutes, dried, and subjected to the alkali treatment, so that yttrium hydroxide was precipitated on the surface of the nickel hydroxide layer.

With the above explained processes, the nickel electrode E1 that retains 1% of yttrium, in molar percent of metal, relative to the total amount of nickel contained in its active material was prepared.

A control nickel electrode R1 was prepared in the same manner as that for the nickel electrode E1 except that the nickel substrate was not made through the process in which yttrium hydroxide is precipitated on the surface of the nickel hydroxide layer, and instead, it was impregnated with the solution A into which a certain amount of yttrium nitrate had been added, so that the nickel electrode will retain, when completed, 1% of yttrium, in molar percent of metal, relative to the total amount of nickel contained in the active material. In this manner, active material mainly composed of nickel was formed on the nickel substrate, completing the nickel electrode R1.

Respectively using the above prepared nickel electrode E1 and the nickel electrode R1 as the positive electrodes, and electrodes made of cadmium as the negative electrodes, nickel-cadmium batteries each with the nominal capacity of 1.2 Ah and the SC size were produced. Characteristics of the above produced nickel cadmium batteries were evaluated. The battery in which the nickel electrode E1 is used as the positive electrode is referred to as a battery EC1, whereas the battery in which the nickel electrode R1 was used as the positive electrode is referred to as a battery RC1.

Evaluation of Battery Characteristics

The charging characteristics at high temperatures were observed to evaluate the characteristics of the batteries EC1 and RC1.

Charging Characteristics at High Temperatures

Each battery was charged at a current of 0.1 C (120 mA) for 16 hours at the ambient temperature of 60° C., left for 3 hours at 25° C., and discharged at a current of 1 C (1200 mA) until the voltage of the battery drops to 0.8V, at this point, the discharge capacity was measured. The battery is evaluated based on the utilization factor of the active material calculated by the following equation 1.

Utilization factor of active material (%)=(discharge capacity until 0.8 V)/(theoretical capacity of nickel hydroxide)×100  Equation 1

The results of this experiment are shown in Table 1.

TABLE 1

| Positive Electrode | Utilization Factor of Active Material (%) |
|---|---|
| E1 | 61.1 |
| R1 | 53.4 |

From Table 1, it can be seen that the utilization factor of the active material of the battery EC1 (with the positive electrode E1) in which yttrium is retained on the surface of the nickel hydroxide layer so that a layer of yttrium is exposed to the electrolyte, is greater than that of the battery RC1 (with the positive electrode R1) in which yttrium is dispersed into the nickel hydroxide layer in a state of a solid solution. This indicates that the battery EC1 exhibits superior charging efficiency to that of the battery RC1 at high temperatures.

Experiment 2
Nickel-cadmium Battery Used in Experiment 2

A nickel substrate with the porosity of 80% was impregnated with an aqueous solution B composed of nickel nitrate and cadmium nitrate at the molar ratio of Ni:Cd=100:2. The nickel substrate was then made through the alkali treatment process a plurality of times, so that a nickel hydroxide layer mainly composed of nickel hydroxide containing no cobalt was formed on the nickel substrate.

Following this, the nickel substrate was impregnated with a 0.5M of yttrium nitrate solution whose pH has been adjusted to 5, for 30 minutes, dried, and subjected to the alkali treatment, so that yttrium hydroxide was precipitated on the surface of the nickel hydroxide layer.

With the above explained processes, the nickel electrode E2 that contains no cobalt and retains 1% of yttrium, in molar percent of metal, relative to the total amount of nickel contained in its active material was prepared.

Nickel electrodes E3, E4, E5, E6, E7, E8, E9, and E10 were prepared in the same manner as that for the nickel electrode E2 except that nickel substrates were respectively impregnated with the solutions B into which certain amounts of cobalt had been added. The nickel electrodes E3, E4, E5, E6, E7, E8, E9, and E10 that respectively contain 0.2%, 0.5%, 2%, 3%, 4%, 5%, 6%, and 7% of cobalt, in molar percent of metal, relative to the amount of nickel contained in the nickel hydroxide layers, and that respectively retain 1% of yttrium, in molar percent of metal, relative to the total amount of nickel contained in the active materials, on the surface of the active materials were prepared.

Respectively using the above prepared nickel electrode E2, E3, E4, E5, E6, E7, E8, E9, and E10 as the positive electrodes, nickel-cadmium batteries each with the nominal capacity of 1.2 Ah and the SC size were produced. Characteristics of the above produced nickel cadmium batteries were evaluated.

Evaluation of Battery Characteristics

Figure 4:
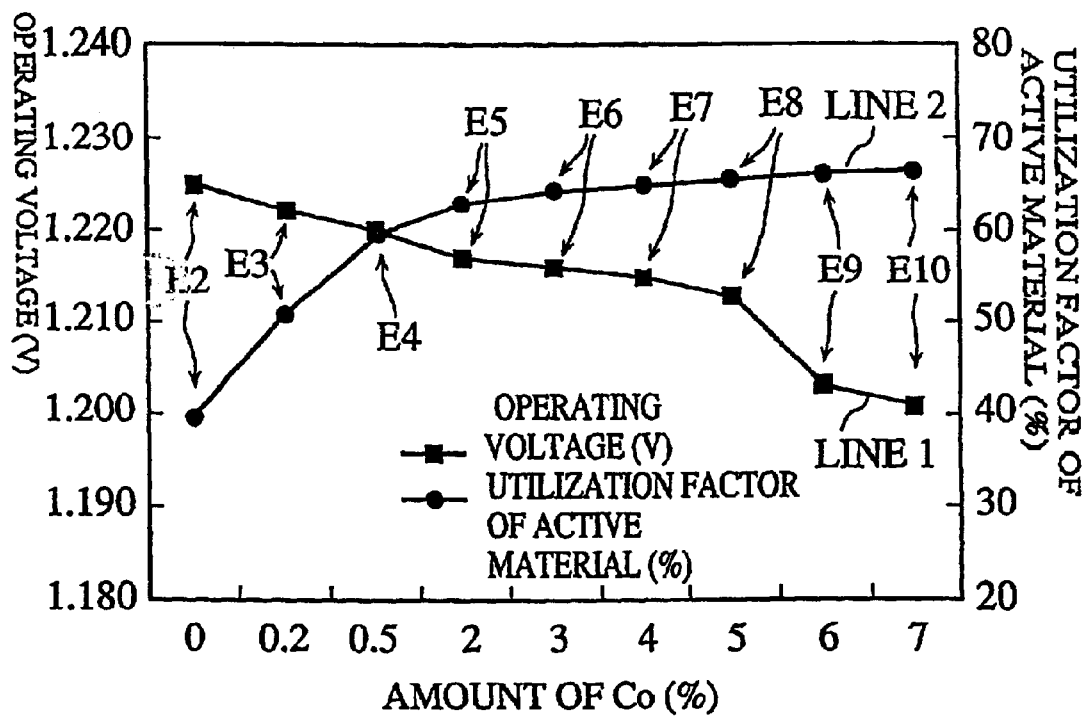
FIG. 4 is a graph showing the relationships between the amount of cobalt included in the positive electrode and the operating voltage, and the utilization factor of the active material.

The charging characteristics at high temperatures were observed to evaluate the characteristics of the batteries. The results of this experiment are shown in FIG. 4. Line 1 is a characteristic curve showing the relationship between the amount of cobalt and the operating voltage. Line 2 is a characteristic curve showing the relationship between the amount of cobalt and the utilization factor of the active material.

Measurement of Operating Voltage

The intermediate voltage (V) of the battery when the battery is charged at a current of 0.1 C (120 mA) for 16 hours at the ambient temperature of 25° C. is measured as the operating voltage. The intermediate voltage is a voltage of the battery at the point when the battery is discharged for a half of a period taken for discharging the battery to the target voltage of 0.8V.

The following tendencies are found from FIG. 4. The operating voltage becomes lower as the amount of cobalt increases. On the other hand, the utilization factor of the active material (%) becomes higher as the amount of cobalt increases.

Considering the above tendencies and the manufacturing cost, it is desirable that the ratio of cobalt to be contained, expressed in molar percent of metal, is in the range of 0.5% to 3% relative to the amount of nickel contained in the nickel hydroxide layer supported by the nickel substrate.

Experiment 3

Nickel-cadmium Battery Used in Experiment 3

A nickel substrate with the porosity of 80% was impregnated with an aqueous solution composed of nickel nitrate, cobalt nitrate, and cadmium nitrate at the molar ratio of Ni:Co:Cd=100:1:2. The nickel substrate was then made through the alkali treatment process a plurality of times, so that a nickel hydroxide layer (active material) mainly composed of nickel hydroxide was formed on the nickel substrate. A plurality of nickel substrates were prepared in this manner.

Following this, the plurality of nickel substrates prepared as above were respectively impregnated with yttrium nitrate solutions with the concentrations of 0M, 0.02M, 0.05M, 0.1M, 0.2M, 0.3M, 0.4M, 0.5M, 0.6M, 0.7M, 0.8M, 0.9M, and 1.0M for 30 minutes. Each nickel substrate was then dried, and subjected to the alkali treatment, so that yttrium hydroxide was precipitated on the surface of the nickel hydroxide layer.

With the above explained processes, nickel electrodes E11, E12, E13, E14, E15, E16, E17, E18, E19, E20, E21, E22, and E23 that each contain 1% of cobalt, in molar percent of metal, relative to the amount of nickel contained in the nickel hydroxide layer and retains a certain amount of yttrium were prepared. The nickel electrodes E11, E12, E13, E14, E15, E16, E17, E18, E19, E20, E21, E22, and E23 respectively retain 0%, 0.1%, 0.3%, 0.5%, 1.1%, 2.0%, 3.2%, 4.1%, 5.3%, 6.2%, 7.0%, 8.1%, and 9.0% of yttrium, in molar percent of metal, relative to the total amount of nickel contained in their active materials.

Respectively using the above prepared nickel electrodes E11, E12, E13, E14, E15, E16, E17, E18, E19, E20, E21, E22, and E23 as the positive electrodes, nickel-cadmium batteries each with the nominal capacity of 1.2 Ah and the SC size were produced. Characteristics of the above produced nickel cadmium batteries were evaluated.

Evaluation of Battery Characteristics

Figure 5:
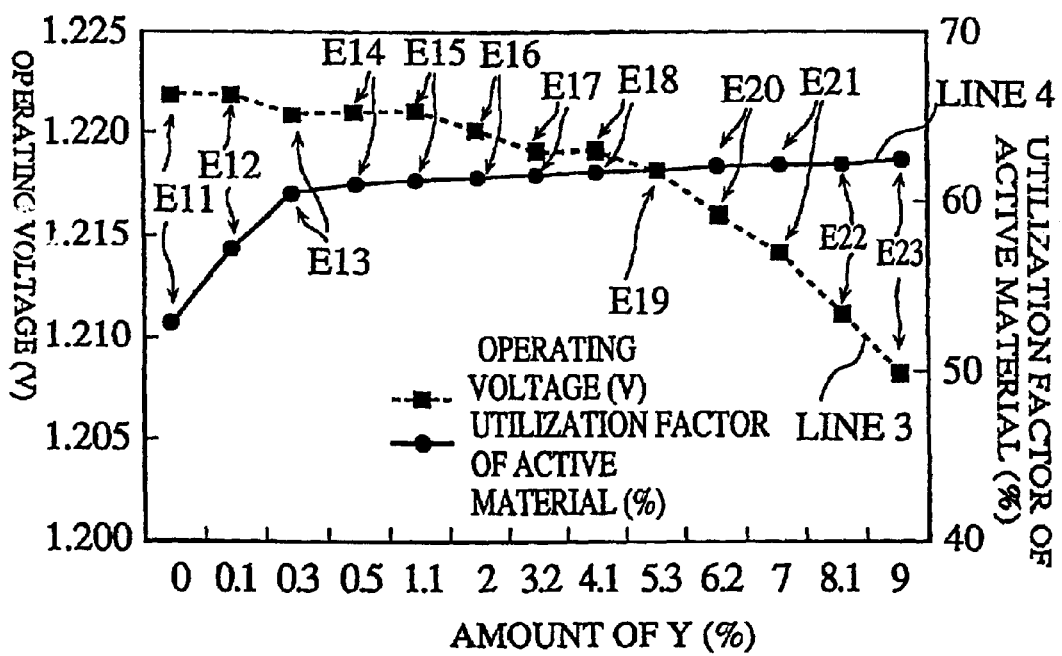
FIG. 5 is a graph showing the relationships between the amount of yttrium included in the positive electrode and the operating voltage, and the utilization factor of the active material.

As in the above experiments, the charging characteristics at high temperatures were observed to evaluate the characteristics of the batteries. The results of this experiment are shown in FIG. 5. Line 3 is a characteristic curve showing the relationship between the amount of yttrium and the operating voltage. Line 4 is a characteristic curve showing the relationship between the amount of yttrium and the utilization factor of the active material.

The following tendencies are found from FIG. 5. The operating voltage becomes lower as the amount of yttrium increases. On the other hand, the utilization factor of the active material (%) becomes higher as the amount of yttrium increases.

In more detail, when the ratio of yttrium, expressed in molar percent of metal, is less than 0.3% relative to the total amount of nickel contained in the active material, the utilization factor of the active material decreases greatly, as compared to the case where the ratio of yttrium, expressed in molar percent of metal, is at least 0.3% relative to the total amount of nickel contained in the active material, to the extent that the characteristics of the battery are greatly impaired.

Also, when the ratio of yttrium, expressed in molar percent of metal, exceeds 5% relative to the total amount of nickel contained in the active material, (this is the case of the battery with the electrode E20), the operating voltage of the battery decreases greatly, as compared to the case where the ratio of yttrium, expressed in molar percent of metal, is less than 5% relative to the total amount of nickel contained in the active material, to the extent that the characteristics of the battery are greatly impaired.

Considering these tendencies, it is desirable that the ratio of yttrium, expressed in molar percent of metal, is in the range of 0.3% to 5% relative to the total amount of nickel contained in the active material.

Experiment 4

Nickel-cadmium Battery Used in Experiment 4

A nickel substrate with the porosity of 80% was impregnated with an aqueous solution composed of nickel nitrate, cobalt nitrate, and cadmium nitrate at the molar ratio of Ni:Co:Cd=100:1:2. The nickel substrate was then made through the alkali treatment process a plurality of times, so that a nickel hydroxide layer mainly composed of nickel hydroxide was formed on the nickel substrate. A plurality of nickel substrates were prepared in this manner.

Following this, the plurality of nickel substrates prepared as above were respectively impregnated with solutions composed of yttrium nitrate and nickel nitrate at the molar ratios of Y:Ni=0:100, 10:90, 20:80, 50:50, 80:20, 90:10, and 100:0, for 30 minutes. Each nickel substrate was dried, and then subjected to the alkali treatment, so that yttrium hydroxide was precipitated on the surface of its nickel hydroxide layer.

With the above explained processes, nickel electrodes E24, E25, E26, E27, E28, E29, and E30 that each contain 1% of cobalt, in molar percent of metal, relative to the amount of nickel contained in the nickel hydroxide layer, and retains a certain amount of yttrium were prepared. The nickel electrodes E24, E25, E26, E27, E28, E29, and E30 respectively retain 0%, 0.4%, 1.0%, 2.1%, 3.3%, 3.6%, and 4.1% of yttrium, in molar percent of metal, relative to the total amount of nickel contained in their active materials.

Respectively using the above prepared nickel electrodes E24, E25, E26, E27, E28, E29, and E30 as the positive electrodes, nickel-cadmium batteries each with the nominal capacity of 1.2 Ah and the SC size were produced. Characteristics of the above produced nickel cadmium batteries were evaluated.

Evaluation of Battery Characteristics

As in the above experiments, the charging characteristics at high temperatures were observed to evaluate the characteristics of the batteries. The results of this experiment are shown in Table 2.

TABLE 2

| Positive Electrode | Utilization Factor of Active Material (%) | Amount of Y (%) |
| --- | --- | --- |
| E30 | 61.6 | 4.1 |
| E29 | 61.5 | 3.6 |
| E28 | 61.3 | 3.3 |
| E27 | 60.5 | 2.1 |
| E26 | 60.1 | 1.0 |
| E25 | 55.5 | 0.4 |
| E24 | 52.9 | 0.0 |

As can be seen from Table 2, the greater the amount of yttrium, the higher the utilization factor of the active material. However, the utilization factor of the active material decreases dramatically when the ratio of yttrium, expressed in molar percent of metal, is less than 20% relative to the total amount of metals contained on the surface of the active material. The reason for this phenomenon can be considered as follows. The smaller the amount of yttrium that comes in contact with the electrolyte becomes, the more the utilization factor of the active material decreases. When the ratio of yttrium to be retained on the surface of the nickel hydroxide layer, expressed in molar percent of metal, is less than 20% relative to the total amount of metals contained therein, the amount of yttrium that comes in contact with the electrolyte decreases.

Considering these tendencies, it is desirable that the appropriate amount of yttrium is used, so that the ratio of yttrium, expressed in molar percent of metal, is at least 20% relative to the total amount of metals contained in the yttrium retaining layer formed on the surface of the nickel hydroxide layer.

In the above embodiment, for forming active material for use in a positive electrode, the nickel substrate is subjected to the alkali treatment so that a nickel hydroxide layer and an yttrium hydroxide layer are formed on the nickel substrate in said order, or an eutectic layer composed of nickel hydroxide and yttrium hydroxide is formed on the nickel substrate. However, other cases are also possible. For example, nickel hydroxide particles with which a predetermined amount of cobalt has been mixed may be covered with an yttrium hydroxide layer or an eutectic layer composed of nickel hydroxide and yttrium hydroxide, forming the active material for use in the positive electrode. A three-dimensional porous member may be impregnated with the active material formed in this way, so as to produce the positive electrode.

Also, an element selected from the group consisting of Ca, Al, Sr, Sc, and Ln may be used instead of yttrium in the above embodiment. A single use of the above elements, or yttrium is possible, whereas the combined use of some of the elements is also possible.

Although the above embodiment explains a case of a nickel-cadmium battery as one example of an alkaline storage battery, it may also be other batteries such as a nickel-metal hydride battery.

As can be seen from the above explanations, the present invention aims to provide a nickel electrode for an alkaline storage battery, including: a conductive porous member; and an active material with which the conductive porous member is filled, the active material including (a) a main active material layer substantially made of nickel hydroxide, the main active material layer containing cobalt in a state of a solid solution, and (b) a compound layer that contains at least one element selected from the group consisting of calcium, aluminum, strontium, scandium, yttrium, and lanthanoide series, the compound layer being formed on a surface of the main active material layer, wherein a metal molar ratio of cobalt contained in the main active material layer to nickel contained in the main active material layer is in a range of 0.5% to 3.0% inclusive, and a metal molar ratio of the at least one element contained in the compound layer to nickel contained in the active material is in a range of 0.3% to 5.0% inclusive.

The present invention also aims to provide a method of manufacturing a nickel electrode for an alkaline storage battery, including: a step for filling a conductive porous substrate with a main active material substantially made of nickel hydroxide, the main active material containing cobalt at a metal molar ratio of 0.5% to 3.0% in a state of a solid solution; and a step for forming a compound layer containing at least one element selected from the group consisting of calcium, aluminum, strontium, scandium, yttrium, and lanthanoide series, on a surface of the main active material.

The present invention further aims to provide a method of manufacturing a nickel electrode for an alkaline storage battery, including: a step for forming an active material by forming a compound layer on a surface of a main active material, the main active material being substantially made of nickel hydroxide and containing cobalt at a metal molar ratio of 0.5% to 3.0% in a state of a solid solution, the compound layer containing at least one element selected from the group consisting of calcium, aluminum, strontium, scandium, yttrium, and lanthanoide series; and a step for filling a conductive porous substrate with the active material.

With this construction, a nickel electrode for an alkaline storage battery that would provide an alkaline storage battery with higher operating voltage and prevent the charging efficiency from being lowered when the alkaline storage battery employing the nickel electrode is charged at high temperatures is realized.

Although the present invention has been fully described by way of examples with reference to the accompanying drawings, it is to be noted that various changes and modifications will be apparent to those skilled in the art. Therefore, unless such changes and modifications depart from the scope of the present invention, they should be constructed as being included therein.

What is claimed is:

1. A nickel electrode for an alkaline storage battery, comprising:
   a conductive porous member; and
   an active material with which the conductive porous member is filled, the active material including (a) a main active material layer substantially made of nickel hydroxide, the main active material layer containing cobalt in a state of a solid solution, and (b) a compound layer that contains at least one element selected from the group consisting of calcium, aluminum, strontium, scandium, yttrium, and lanthanoide series, the compound layer being formed on a surface of the main active material layer,
   wherein a metal molar ratio of cobalt contained in the main active material layer to nickel contained in the main active material layer is in a range of 0.5% to 3.0% inclusive, and a metal molar ratio of the at least one element contained in the compound layer to nickel contained in the active material is in a range of 0.3% to 5.0% inclusive,
   wherein the metal molar ratio of the at least one element selected from the group consisting of calcium, aluminum, strontium, scandium, yttrium, and lanthanoide series is at least 20% in the compound layer formed on the surface of the main active material layer.

2. A nickel electrode for an alkaline storage battery, comprising:
   (a) a conductive porous member; and
   (b) an active material with which the conductive porous member is filled, the active material comprising
      (i) a main active material layer of nickel hydroxide including cobalt in the state of solid solution, formed on the conductive porous member, and
      (ii) a compound layer formed on the surface of the main active material layer, containing at least one element selected from the group consisting of calcium, aluminum, strontium, scandium, yttrium, and lanthanoide series,
   wherein the metal molar ratio of the at least one element selected from the group consisting of calcium, aluminum, strontium, scandium, yttrium, and lanthanoide series is at least 20% in the compound layer formed on the surface of the main active material layer.

3. A nickel electrode for an alkaline storage battery, comprising:
- (a) a conductive porous member; and
- (b) an active material with which the conductive porous member is filled, the active material comprising
  - (i) a main active material layer of nickel hydroxide including cobalt in the state of solid solution, formed on the conductive porous member, and
  - (ii) a compound layer formed on the surface of the main active material layer, containing at least one element selected from the group consisting of calcium, aluminum, strontium, scandium, yttrium, and lanthanoide series, wherein the metal molar ratio of the at least one element selected from the group consisting of calcium, aluminum, strontium, scandium, yttrium, and lanthanoide series is at least 20% in the compound layer formed on the surface of the main active material layer, and wherein a metal molar ratio of cobalt contained in the main active material layer to nickel contained in the main active material layer is in a range of 0.5% to 3.0% inclusive.

4. A nickel electrode for an alkaline storage battery, comprising:
- (a) a conductive porous member; and
- (b) an active material with which the conductive porous member is filled, the active material comprising
  - (i) a main active material layer of nickel hydroxide including cobalt in the state of solid solution, formed on the conductive porous member, and
  - (ii) a compound layer formed on the surface of the main active material layer, containing at least one element selected from the group consisting of calcium, aluminum; strontium, scandium, yttrium, and lanthanoide series, wherein the metal molar ratio of the at least one element selected from the group consisting of calcium, aluminum, strontium, scandium, yttrium, and lanthanoide series is at least 20% in the compound layer formed on the surface of the main active material layer, and wherein a metal molar ratio of the at least one element contained in the compound layer to nickel contained in the active material is in a range of 0.3% to 5.0% inclusive.

* * * * *